Jan. 20, 1959
J. T. McKNIGHT
2,869,463
DELAYED FIRING CARTRIDGE
Filed March 26, 1956
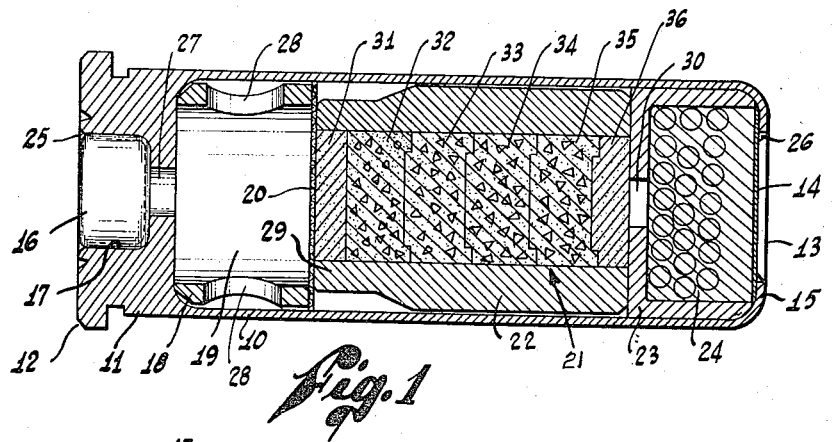
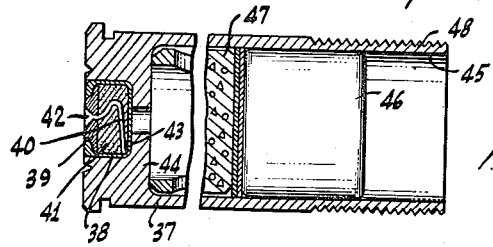
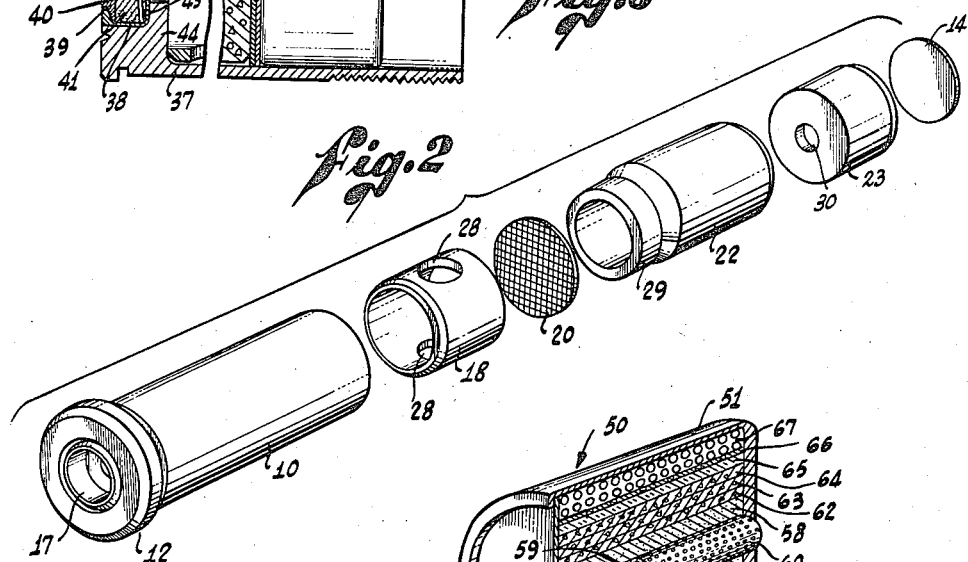
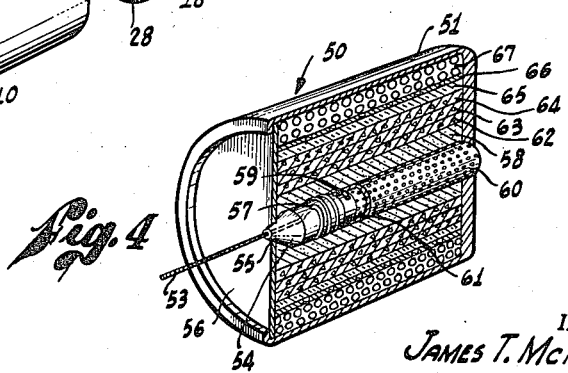
INVENTOR.
JAMES T. McKNIGHT
BY Edmond L. Shanahan
ATTORNEY

United States Patent Office 2,869,463
Patented Jan. 20, 1959

2,869,463

DELAYED FIRING CARTRIDGE

James T. McKnight, Los Angeles, Calif., assignor to Bermite Powder Company, Saugus, Calif., a corporation of California Application March 26, 1956, Serial No. 573,684

4 Claims. (Cl. 102—39)

This invention relates generally to explosive cartridges, and more particularly to a cartridge which is manufactured to explode a predetermined number of seconds or fraction of a second after firing. In its preferred form, the invention includes a train of pressure-consolidated ignitable charges containing metal and metallic oxide which serves as a fuse leading from a primer and an initial shock chamber to an explosive propellant adapted to deliver a work output on some device such as a parachute assembly.

The cartridge of the present invention provides a reliable means for opening a parachute a precise interval of time after an object has been dropped from an airplane. Heretobefore, the most widely used means for opening a parachute on a dropped object has been by means of a rop cord line extending from the plane, and of a length believed to be great enough to avoid entanglement of the parachute by the plane or the air currents produced by it. The rip cord line itself has been a cause of erratic performance and accident, however. Sometimes it became entangled with the plane and dropped object, or with other planes or parachutes engaged in the same dropping operation. The time lapse before opening of the parachute could not be controlled with accuracy. The lines and mechanical connections added useless weight and were subject to deterioration and damage even prior to use.

The delayed firing cartridge eliminates the need for any connection between the plane and the dropped object. It and the operating mechanism by which it opens the parachute are very reliable in operation, small in size, and light in weight. Moreover, the cartridge can be fabricated to discharge at precisely the desired interval after firing, without being subject as rip cord lines are, to variations in time arising out of different flying and dropping conditions.

The present cartridge may be used in other applications in which a time fuse is required, particularly for delivering a few foot pounds of work after the lapse of a few seconds. It can be used in aircraft ejector seats, missile mechanism, submarine emergency devices, fire alarm systems, etc. In larger sizes the time delay and energy output can be greatly increased. In such sizes, it can be used for small blasting purposes, and in devices for lifting heavy objects into position.

In order that the cartridge may effectually serve these purposes, it must discharge precisely at a predetermined time after firing. Moreover, its reliability must not be impaired by long periods of storage, or exposure to airplane engine vibration. Its firing time must not be appreciably affected by the shock of the explosion of its own primer.

It is therefore a major object of the present invention to provide a delayed firing cartridge which will absorb the brissance of its own firing without adverse effect on its accuracy of time delay.

It is another important object of the invention to provide a cartridge construction which can be readily manufactured to a predetermined time delay.

It is a further object to provide a cartridge construction which can withstand long periods of vibration and much rough handling without alteration in time delay or reliability of firing.

The time delay of the cartridge is provided by the burning of a train of slow burning mixtures containing, primarily, powdered metals and metallic oxides, similar to the well known Thermite mixture of powdered aluminum and powdered iron oxide. An inert material may also be included in the mixture to slow down the speed of reaction, if desired. The preferred powder for the time delay is that developed by the Naval Ordnance Laboratory at White Oaks, Maryland, and designated by the formula number D-16. Preferably, the burning of the delay train is initiated and completed by first fire and after fire charges, respectively, which are comprised of the metal, metal oxide, and inert ingredient mixture different from that of the delay powder. The preferred material for first fire and after fire is the powder developed and designated by the United States Naval Ordnance Laboratory at White Oaks, Maryland, as F33b. However, any powdered mixture, stable under ordinary conditions, and slow burning with the production of substantially no gas may be used. The mixture may include one or more active metals, such as aluminum or magnesium and one or more oxides or oxidizing compounds of weaker metals, such as iron. Some traces of organic matter may be present, but all gas producing combustibles must be extremely minute in quantity, since the delay train must burn while completely contained within the cartridge, and without any provision for the escape of gas. Excessive pressure rise within the cartridge causes erratic burning of the time delay train.

Some gas production by firing of the primer and the burning of organic impurities unavoidably present in the powder of the delay train is inevitable. It is one of the novel features of this invention that the construction provides an empty pressure chamber of maximum volume consistent with ruggedness and small cartridge size to minimize both firing shock and pressure rise from gas forming combustibles.

Other objects and advantages of the invention will be apparent from the following description of specific embodiments illustrated in the drawings in which:

Figure 1 is a longitudinal sectional view of a preferred form of the delayed firing cartridge;

Figure 2 is an exploded perspective view of the cartridge assembly of Figure 1;

Figure 3 is a longitudinal sectional view, with the center portion removed, of another embodiment of the invention; and Figure 4 is a perspective view of a longitudinally sectioned cartridge constructed with cylindrical laminations.

In Figure 1, a cylindrical shell casing 10, having a relatively thick base 11 at its firing end 12, is closed at its discharge end 13 by a thin closure disc 14 held in position by the inwardly rolled flange 15 formed in the end of the case 10.

A primer capsule 16 is tightly fitted into a primer recess 17 in the base 11. Both the case 10 and the primer capsule 16 may be standard ammunition materials. For example, a standard brass .38 caliber shell case may be used; and a standard Winchester percussion primer, such as the M-42 low power primer used in hand grenades, is suitable. It will be understood, however, that the invention is not restricted to M-42 primers or even to percussion primers. Various suitable primers can be prepared by those skilled in the art, for example using various mixtures of potassium chlorate and lead sulfocyanate, or lead styphnate alone; and electrical ignition may be used instead of percussion.

The internal structure of the cartridge is comprised of four parts, usually made of brass, and assembled in order from firing to discharge end, and illustrated in perspective in Figure 2, as follows: a spacer 18 enclosing a shock chamber 19; a support screen 20 for supporting a delay train 21 comprised of a column of pellets of slow burning material; a delay tube 22 for housing the delay train 21; and a propellant cup 23 used to contain the propellant 24, which delivers the output energy when discharged. Preferably, a moisture proof varnish is applied around the edges of the primer capsule 16 and flange 15 at 25 and 26 to provide a seal.

As seen in Figure 1, the assembly provides an enclosed burning path from the primer 16 to the propellant 24. A small concentric hole 27 in the base 11 provides an open passage communicating between the primer and the shock chamber 19. The volume of the chamber 19 is enlarged by holes 28 in spacer 18 and by the space between the inner wall of the case 10 and the outer walls of the spacer and the delay tube 22. The annular inter-wall space may be a considerable percentage of the total shock absorbing volume since both spacer 18 and delay tube 22 ordinarily are made to fit rather loosely into the case 10. This volume may be further increased by reducing the diameter of the delay tube 22 for part of its length near the firing end as indicated at 29. The reduced diameter 29 also facilitates assembly since it avoids binding between the delay tube and the case 10 as a result of the draft taper normally produced in shell casings by the forming dies.

The support screen 20 in cartridges of the .38 caliber size is preferably about twenty mesh and woven of wire about .016" diameter. The screen must be of sufficient strength to support the delay train 21 during a great many hours of aircraft engine vibration and during firing, but must be porous enough to permit ready ignition of the delay train.

The propellant cup 23 is provided with a hole 30 in its bottom to provide open communication between the discharge end of the delay train 21 and the propellant 24.

When the cartridge of Figures 1 and 2 is fired by striking the percussion primer capsule 16, the primer explosion bursts the capsule at the hole 27 and fills the shock chamber 19 with hot gases. The pressure within the shock chamber suddenly rises, but the chamber muffles the shock of the explosion to some degree and prevents it from damaging or altering appreciably the time characteristic of the delay train 21.

The hot gases produced by the primer explosion penetrate the support screen 20 and ignite the firing end of the delay train 21. The delay train illustrated in Figure 1 is comprised of a first fire pellet 31 which ignites readily and quickly and reliably initiates burning of a series of four pellets of time delay powder 32 to 35. After these four have been consumed one by one in turn, an afterfire pellet 36 is ignited by the final burning of the last time delay pellet 35, and produces heat and combustion products which pass through the hole 30 and detonate the propellant 24.

The powders of pellets 31 to 36 are ordinarily referred to as "gasless" since they are supposed to burn solely by the transfer of oxygen between solids and without the evolution of any gaseous combustion products. However, some gas is inevitably produced by unavoidable organic impurities, and it is a second important function of the shock chamber 19 to contain these gaseous combustion products within the case 10 during combustion of the delay train 21 without an excessive pressure rise, which might introduce unpredictable variations in the time delay. It will be understood that the chamber 19 might be filled with some structural aid having many open spaces and interstices and still be "empty" in the sense of providing space for gas.

It is an important feature of the invention, in its preferred form, that the delay train is made up of a series of layers or pellets, each of which is less in thickness (in the direction of fire travel) than in its transverse dimension. Thus, in the embodiment of Figure 1, each of the cylindrical pellets 31 to 36 has an axial thickness less than its diameter. This structural arrangement has been found to produce more reliable cartridges since the consolidation pressure applied to each layer during manufacture can be more effective, and the delay train so constructed seems to survive vibration and firing better by virtue of it.

The delay train 21 may be manufactured by introducing powder for each successive layer into the delay tube 22 as powder and consolidating each layer under pressure. However, it is a preferred method of fabricating the cartridge to make up each layer as a pre-consolidated pellet, assemble the pellets in the delay tube 22, and reconsolidate the entire delay train 21 on a ram. Another feature of the pelletized construction illustrated in Figure 1 is that several of the pellets are formed with mating recesses and projections on their adjacent faces so as to increase the strength of the delay train column.

The consolidation pressures most successfully used have been in the range of 20,000 to 50,000 pounds per square inch. However, density can be slightly increased by pressures up to 100,000 pounds per square inch if timing of the delay train requires it.

Another method of manufacture is to load the first fire and after fire as powder, and the time delay powder in pellet form and then consolidate the delay train.

In most cases, pelletizing at least the delay powder will be found desirable in order to reduce the tendency of the powder to pick up moisture from the air and thereby become erratic in burning rate.

A delay train having a given time of burning can be produced by properly selecting three variable factors: the ingredients and their proportions in the delay powder; the length of the delay train in the direction of burning; and the density to which the layers or pellets of the delay train are consolidated under pressure. The column length is the major manufacturing variable. It will generally be found most practical to select a preferred delay powder composition, a standard consolidation pressure, and then varying time delay by drilling the delay train column to a predetermined length in the delay tube, and filling up the remaining space with afterfire powder. Using this method of manufacture, and selecting spacer and delay tube lengths as required, it has been found comparatively simple to manufacture cartridges having any desired time delay between ¾ of a second and five seconds in a standard .38 caliber case, or any time delay between five and eight seconds in a long case (1.07" overall length). Of course, it will be understood that several experimental runs must be made for each combination of variables in order to properly select manufacturing standards to produce a desired time delay.

The preferred propellant is a double base powder of nitroglycerine colloided with nitrocellulose, such as the Hercules Powder Company's "Unique" brand. However, nitrocellulose alone can be used. Preferably, the propellant powder is finely divided with a maximum of surface area, for example by slicing extruded rods of the material into small discs about .002" or .007" thick and about .030" in diameter. In the typical delay cartridge of the .38 caliber size, the propellant work output is about 35 to 50 foot pounds, sufficient to move a small piston about .35" in diameter through a stroke of about 2½" against a 200 pound dead load.

The embodiment of Figure 3 illustrates two variants from the cartridge of Figure 1. A cartridge 37 is shown fragmentarily since it differs from Figure 1 only in the primer arrangement and in the discharge end. Instead of being fired by percussion as in the cartridge of Figure 1, the cartridge 37 is fired electrically. The primer pellet 38 has a base 39 of plastic or other insulating material. An electrical heating element 40 is embedded in the primer powder 41, with one end 42 passing through the insulating base 39 to the exterior for contact with an electrical firing means, and the other end 43 grounded to the case 44 of the cartridge 37. Thus, when the cartridge 37 is placed in a firing tube with the element end 42 against an insulated terminal electrically communicating through a switch (not shown) with a source of electrical power, and the other terminal of said source is in electrical communication with element end 43 by ground connection, firing can be accomplished by closing the switch.

Cartridge 37 has cylindrical extension 45 instead of flanges at the discharge end, and a self-contained piston 46 to which the propellant 47 delivers its work output. The exterior of the cylindrical extension 45 may be threaded to provide convenient attachment to the device which its piston 46 is intended to actuate.

The cartridge 50 illustrated in Figure 4 is radically different from the two embodiments illustrated in Figures 1 to 3, in that the time delay train is designed to burn radially instead of axially. The case 51 is relatively short in axial length and large in diameter. Its base 52 is solid and contains no primer recess or opening to the interior of the case 51. Indeed, this particular cartridge contains no primer at all, although it will be understood that either the primer or primerless design may be used with either radially or axially burning cartridges.

An electrical firing lead 53 enters the cartridge 50 through its discharge end by way of an axial plug 54 of plastic or other insulating material, which projects from a hole 55 in the center of the closure disc 56.

The electrical lead 53 passes through the interior of plug 54, emerging at 57. It is coiled around plug 54 in contact with a cylindrical layer 58 of first fire powder, and at its terminus 59 is grounded to a perforated metal tube 60, which is axially disposed within the shell 51 and seats on a shoulder 61 on the inner end of the plug 54. The interior of the tube 60 provides a pressure cushioning chamber for combustion gases.

Three successive cylindrical time delay layers, 62, 63, and 64, and a cylindrical afterfire layer 65 enclose the first fire layer 58. This radially burning time delay train is enclosed in a perforated metal cylinder 68. The annular space remaining within the case 50 is filled with propellant 67.

Electrical firing of the cartridge 50 takes place in the same manner as in the case of cartridge 37 of Figure 3, except that an electrical lead 53 from the discharge end is used for supplying the firing current, and the first fire powder is fired directly without the intermediate firing of a primer.

It will be obvious to those skilled in the art of explosive cartridges that many variations of my invention can be designed without departing from its scope. I have set forth the specific embodiments above described as illustrations and not for purposes of limitation, the limits of my invention being solely those set forth in the following claims.

I claim:

1. A delayed firing cartridge which includes: an elongated tubular imperforate side walled case having a firing end with a relatively heavy wall and an exterior recess, and a discharge end with a relatively large opening; a closure disc closing said discharge end; a primer mounted in said recess in the exterior of said firing end and communicating with the interior of said case through an opening in said firing end; a cylindrical spacer disposed coaxially within said case and enclosing an empty chamber adjacent said firing end; a propellant cup in the discharge end of said case, said propellant cup having one end opening to said closure disc and having a relatively small opening toward the firing end; a propellant charge in said propellant cup; a delay tube for containing a time delay train extending between said spacer and said propellant cup; a support screen between said spacer and said delay tube; and a delay train comprised of a first fire layer of powder, a succession of layers of slow burning powder, and an afterfire layer of powder, each of said layers having an axial length less than its diameter, and each having been consolidated under a pressure of between 20,000 and 50,000 pounds per square inch.

2. A delayed firing cartridge which includes: an elongated tubular imperforate side walled case having a firing end with a relatively heavy wall and a discharge end with a relatively large opening; a primer housed in a primer chamber in said heavy wall at said firing end, said primer chamber being in communication with the interior of said case through a restricted primer discharge opening; a propellant charge housed in a propellant cup located in said discharge end, said propellant cup opening toward the discharge end and having a restricted propellant firing opening communicating with the interior of said case toward said firing end; a closure cover over the discharge opening of said cup; a cylindrical spacer in the firing end of said case enclosing an empty primer discharge space into which said primer is adapted to discharge through said primer discharge opening, the walls of said spacer being provided with transverse openings to permit open communication between said primer discharge space and the interior surface of said case; a delay train tube between said spacer and said propellant cup, said tube being of diminishing diameter toward said firing end to provide an annular space between the exterior of said delay tube and the interior wall of said case near said firing end; a delay train within said delay tube, said delay train being comprised of series of a first fire layer of readily igniting material, at least one layer of slow burning material, and an after fire layer of readily igniting material arranged in a series from said spacer to said propellant cup; and a support partition providing pervious separation between said primer discharge space and the first firing end of said delay tube.

3. A delayed firing cartridge which includes: an elongated tubular imperforate side walled case having a firing end and a discharge end; a primer housed in a primer chamber at said firing end; wall means defining a barrier between said primer and the interior of said case, said wall being provided with a restricted opening between said primer chamber and the interior of said case; a cylindrical spacer in the firing end of said case enclosing an empty primer discharge space into which said primer is adapted to discharge through said primer discharge opening, the walls of said spacer being provided with transverse openings to permit open communication between said primer discharge space and an annular space between the exterior of said spacer and the interior surfaces of said case; a partition means transversely disposed in said casing and positioned against said spacer, said partition means being provided with a plurality of small openings to provide open communication between said primer discharge space and the remainder of said casing toward the discharge end thereof; a delay train tube closely received in said casing and positioned at one end against said partition means; a delay train within said delay tube, said delay train being comprised primarily of slow burning material extending from said partition means at the firing end of said delay tube to the discharge end thereof; a propellant charge housed in the discharge end of said casing; and propellant wall means transversely disposed in said casing between said delay train and said propellant charge, said propellant wall means being provided with a restricted opening for communication between said delay train and said propellant charge.

4. A delayed firing cartridge which includes: an elongated tubular imperforate side walled case having a firing end and a discharge end; a primer housed in a primer chamber at said firing end; wall means defining a barrier between said primer and the interior of said case, said wall being provided with a restricted opening between said primer chamber and the interior of said case; a cylindrical spacer in the firing end of said case enclosing an empty primer discharge space into which said primer is adapted to discharge through said primer discharge opening, the walls of said spacer being provided with transverse openings to permit open communication between said primer discharge space and an annular space between the exterior of said spacer and the interior surfaces of said case; a partition means transversely disposed in said casing and positioned against said spacer, said partition means being provided with a plurality of small openings to provide open communication between said primer discharge space and the remainder of said casing toward the discharge end thereof; a delay train tube closely received in said casing and positioned at one end against said partition means, said tube being of reduced diameter toward its firing end to provide an annular space between the exterior of said delay tube and the interior wall of said case near said firing end; a delay train within said delay tube, said delay train being comprised of slow burning material extending from the firing end to the discharge end of said delay tube, and a first fire layer of rapidly igniting material between the firing end of said delay train and said partition means, and an after fire layer of readily igniting material at the discharge end of said delay train; a propellant charge housed in the discharge end of said casing; and propellant wall means transversely disposed in said casing between said after fire layer and said propellant charge, said propellant wall means being provided with a restricted opening for communication between said delay train and said propellant charge.

References Cited in the file of this patent

UNITED STATES PATENTS

| | | |
|---|---|---|
| 1,253,947 | De Casanovas | Jan. 15, 1918 |
| 1,878,498 | Lewis | Sept. 20, 1932 |
| 2,440,579 | Frazer | Apr. 27, 1948 |